Patented Aug. 31, 1926.

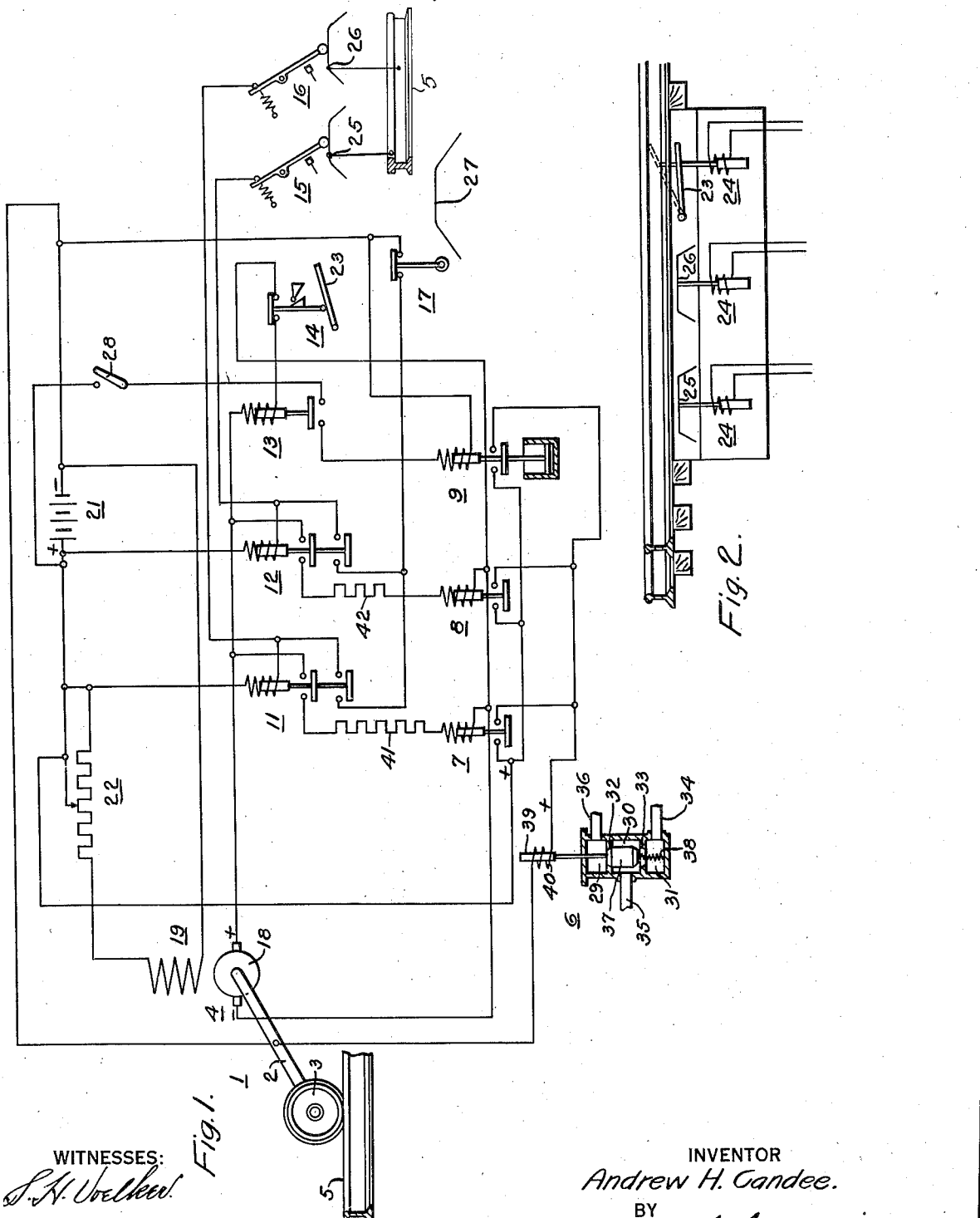

1,597,762

UNITED STATES PATENT OFFICE.

ANDREW H. CANDEE, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC TRAIN CONTROL.

Application filed July 19, 1924. Serial No. 726,914.

My invention relates to control systems and it has particular relation to control systems for automatically governing the speed of a vehicle in accordance with the conditions of the traffic on the same track as the vehicle.

One object of my invention is to provide a simple and economical control system which is positive and reliable in operation for governing the speed of a railway vehicle in accordance with traffic conditions on the track over which the vehicle is traveling.

Another object of my invention is to provide the system of control governing the speed of a railway vehicle in accordance with the speed at which the vehicle is traveling, as well as the condition of the traffic preceding said vehicle on the same track.

A further object of my invention is to provide a control system for governing the speed of a railway vehicle in accordance with track conditions and upon failure of said control system to provide means for automatically stopping the vehicle.

Briefly stated, my invention consists in mounting a generator upon a motor vehicle and having the speed of the rotor of the generator directly proportional to the speed of said vehicle and employing said generator with other electrical equipment which is governed by track conditions, to govern the speed of said vehicle by applying the air brakes.

In other words, the vehicle speed is governed by both its own speed and the conditions of the track upon which it is traveling.

For a better understanding of my invention, reference may be made to the accompanying drawing, Figure 1 of which is a diagrammatic view of a control system constructed in accordance with my invention.

Fig. 2 is a diagrammatic view, in side elevation, of track equipment employed to cooperate with the equipment upon the vehicle to govern the speed of the train.

Referring particularly to Fig. 1 of the drawing, a vehicle 1, only a relatively small portion of which is shown, comprises an axle 2, a wheel 3 securely mounted thereon, and a dynamo-electric machine or generator 4 mechanically connected to said axle 2. The wheel 3 is movably mounted upon one of the rails 5 upon which the vehicle 1 travels. The vehicle 1 has mounted thereon an electrically-governed brake valve device 6 for controlling the brakes (not illustrated) of the vehicle. The air brake system of the vehicle is not fully illustrated because such systems and their operation are well understood by those skilled in the art of railways.

The operation of the valve device 6 is governed by a plurality of electrically governed switches 7, 8 and 9. The energization of the actuating coils of the switches 7 to 9 inclusive, is respectively governed by the operation of switches 11 to 13 inclusive.

A plurality of switching devices 14 to 17, inclusive, are employed to govern the operation of the switches 11 to 13, inclusive, in a manner hereinafter more fully described.

The generator 4 comprises an armature winding 18 and a separately excited field-magnet winding 19. The armature winding 18 is rotated by the axle 2 to which it is mechanically connected. The energization of field-magnet winding 19 is effected by a constant source of electrical energy 21, such, for example, as a battery. The energization of the field-magnet winding 19 may be regulated by the rheostat 22. The switching device 14 is adapted to be actuated by an inclined member or ground plate 23 which may be raised or lowered by means of an electromagnetic device 24 in accordance with track conditions. By track conditions is meant whether or not vehicles are preceding the vehicle 1 on the same track 5.

A plurality of metallic ground or contact plates 25 and 26 are adapted to be raised or lowered separately by means of electromagnetic devices 24. The plates 25 and 26 are adapted to engage, respectively, the switching device 15 and 16 to complete different return circuits through the track 5 to which each of the plates 25 and 26 are electrically connected.

The stationary plate 27, which is located upon the ground a short distance preceding the plates 25 and 26 in the direction from which the vehicle 1 approaches, is adapted to actuate the switching device 17 to its open position. The location of the plates 23 to 27, inclusive, are at positions just a small distance in advance of each of the standard signal devices or towers employed to indicate to the engineer whether a train is in the next block or in the first or second blocks in advance of the next block. The manually-operated switch 28 is employed to open a circuit comprising the actuating coil of the electrically governed time element switch 9, when the vehicle 1 is not in operation.

The brake valve device 6 comprises three chambers, 29, 30 and 31. The upper chamber 29 is pneumatically connected to the middle chamber 30 by means of an orifice or port 32 and the middle chamber 30 is pneumatically connected with the lower chamber 31 by means of an orifice or port 33. The lower chamber 31 is connected by a pipe 34 to a suitable source of fluid pressure (not illustrated). The middle chamber 30 is connected to brake pipe 35, which is employed for the governing of the air brakes of the vehicle 1. The upper chamber 29 is open to the outside atmosphere by means of an exhaust pipe 36.

A valve member 37 is adapted to close alternately the ports 32 and 33. The valve member 37 is normally maintained in its upper position by means of a spring 38, thereby maintaining the port 32 normally closed. The valve member 37 may be actuated to its lower position by means of an armature member 39 and an actuating coil 40. When the valve member 37 occupies its lower position, the port 32 is open and the port 33 is closed.

The operation of the control system for automatically governing the speed of a train is as follows:—

Let it be assumed that the train is traveling at the rate of 60 miles an hour just prior to entering a stretch of track which is free from any vehicles other than the vehicle 1. The ground plates 23, 25 and 26 will all be lowered so that they do not engage the switching devices 14, 15 and 16, respectively. The switching device 17 will be opened by the ground plate 27 but this will not effect the control system, since switches 11 and 12 occupy their open positions. The vehicle 1 may continue at a speed of 60 miles per hour in the next block.

If it is necessary for the sake of safety, that is, because of traffic conditions, to slow the vehicle 1 down to a speed of 35 miles per hour, the ground plate 26 which is just in advance of the next block, is raised. When the switching device 16 comes in contact with the ground plate 26, a circuit is established from the positive terminal of the battery 21 through the actuating coil of the switch 11, switching device 16, ground plate 26, rail 5, which is electrically connected to plate 26, wheel 3 and axle 2 of the vehicle 1 to the negative terminal of the battery 21.

The energization of the actuating coil of the switch 11 effects its closure. Upon the closure of the switch 11, a holding circuit for the switch 11 is established from the positive terminal of the battery 21, through the actuating coil of the switch 11, lower contact members of the switch 11 and the contact members of the switching device 17 to the negative terminal of the battery 21.

Upon the closure of the switch 11, a circuit is established from the positive terminal of the armature winding 18 of the generator 4 through the upper contact members of the switch 11, resistor 41 and the actuating coil of the switch 7 to the negative terminal of the armature 18 of the generator 4.

By means of the resistor 41 and the rheostat 22, it is possible to so regulate the voltage across the actuating coil of the switch 7, that the closure of the switch 7 is effected when the speed of the vehicle 1 exceeds 35 miles per hour. It is apparent that the voltage across the terminals of the armature winding 18 of the generator 4 is directly proportional to the speed of the vehicle 1, because the speed of the rotation of the armature winding 18 is governed directly by the speed at which the axle 2 of the vehicle 1 rotates. It has been previously set forth that the energization of the field winding 19 is maintained at a constant value.

If the vehicle 1 is not traveling at a speed of 35 miles per hour or more, the voltage across the terminals of the armature winding 18 of the generator 4 will not be sufficient to effect closure of the switch 7. Upon the closure of the switch 7, a circuit is established from the positive terminal of the battery 21 through the contact members of the switch 7, actuating coil 40 of the electrically governed brake valve device 6 to the negative terminal of the battery 21.

Upon the energization of the actuating coil 40 of the brake valve device 6, the armature member 39 as actuated downwardly thereby effecting the opening of the port 32 and the closure of the port 33. Upon the closure of the port 33 and the opening of the port 32, the fluid under pressure from the brake pipe 35 is released through the port 32 to the exhaust pipe 36.

Upon the escape of fluid under pressure from the brake pipe 35 an automatic operation of the brakes occurs.

When the vehicle 1 has traveled through the block in which the speed limit is 35 miles per hour and is just approaching the next block in which its speed is limited to 15 miles per hour because of the condition of traffic in this block or in the blocks preceding it, the switching device 17 is opened by the ground plate 27, thereby effecting the opening of the switch 11 because of the de-energization of its actuating coil. The opening of the switch 11 will effect the opening of the switch 7 thereby de-energizing the actuating coil 40 of the brake valve device 6.

Reduction of speed and consequent reduction in generator voltage will also cause switch 7 to open and this opening will be at a speed somewhat lower than thirty-five miles per hour, thus permitting the train to continue at less than 35 miles per hour.

The switch 7 may be constructed to open a few seconds later than the opening of the switch 11 to permit possible closure of the switch 8 prior to the opening of the switch 7. Approximately, one second after the opening of the switching device 17 by the ground plate 27, either the switching device 16 will be engaged by the ground plate 26, or the switching device 15 will be engaged by the ground plate 25, depending upon the rate of travel to which the vehicle 1 is limited. If the speed of the vehicle 1 is limited to 15 miles per hour, then the ground plate 25 will engage the switching device 15, thereby establishing a circuit from the source of electrical energy 21 through the actuating coil 12, switching device 15, ground plate 25, rail 5 to which it is electrically connected to wheel 3 and axle 2 of vehicle 1 to the negative terminal of the source of electrical energy 21. Upon the closure of the switch 12, a holding circuit is provided from the source of electrical energy 21 through the actuating coil and the lower contact members of the switch 12 and the contact members of the switching device 17 to the negative terminal of the source of electrical energy 21.

Upon the closure of the switch 12, a circuit is established from the positive terminal of the armature 18 of the generator 4 through the upper contact members of the switch 12, resistor 42, actuating coil of the switch 8 to the negative terminal of the armature 18 of the generator 4. The energization of the actuating coil 8 depends upon the voltage of the generator 4 which in turn depends upon the speed at which the vehicle 1 is traveling.

If the vehicle 1 is traveling at a speed greater than 15 miles per hour, then the resistor 42 is so constructed that the voltage across the actuating coil of the switch 8 will be sufficient to effect the closure of the switch 8. The closure of the switch 8 establishes a circuit from the source of the electrical energy 21 through the contact members of the switch 8 and actuating coil 40 of the brake valve device 6 to the negative terminal of the source of the electrical energy 21. The energization of the actuating coil 40 of the brake valve device 6 causes the fluid pressure to be lessened in the brake pipe 35 in the same manner as described when the switch 7 is closed.

When the vehicle 1 is not traveling at 15 miles per hour, the voltage across the generator 4 will not be sufficient to effect the closure of the switch 8, or if vehicle 1 is traveling at greater than 15 miles per hour, its speed will be reduced by the brake application until the switch 8 opens.

Upon the vehicle 1 approaching the next block, the switch device 17 will be opened by the ground plate 27, thereby breaking the holding circuit for the actuating coil for the switch 12. Upon the opening of the switch 12, the actuating coil of the switch 8 is de-energized and the switch 8 will open in a few seconds. The opening of the switch 8 will de-energize the actuating coil 40 of the brake valve device 6 thereby releasing the brakes of the vehicle 1. If, however, the speed limit in the next block is 15 miles per hour, the switch device 15 will engage the ground plate 25, thereby causing the switch 12 to close prior to the opening of the switch 8.

If it is desired to stop the vehicle 1 upon entering the next block, the ground plate 23 is raised to effect the opening of the switching device 14 causing the switch 13 to close. The switch 13 is normally held open when the vehicle 1 is operated by the energization of the actuating coil thereof by means of a circuit from the positive terminal of the armature 18 of the generator 4 through the actuating coil of the switch 13 and contact members of the switching device 14, to the negative terminal of the generator 4. If, from any cause, the generator 4 is rendered inoperative, the switch 13 will be actuated to its closed position by gravity. In either case, the closure of the switch 13 establishes a circuit from the positive terminal of the source of electrical energy 21 through the manually operable switch 28, contact members of switch 13, actuating coil of switch 9 to the negative terminal of the source of electrical energy 21. The energization of the actuating coil of the switch 9 will effect the closure of the switch 9, thereby establishing a circuit through the actuating coil 40 of the brake valve device 6.

The energization of the actuating coil 40 of the brake valve device 6 will release the fluid under pressure in the brake pipe 35 thereby causing the application of the brakes of the vehicle 1. The time element switch 9 is so designed that the generator 4 must become inoperative for several seconds before the switch 9 will close. If the engineer operates the vehicle 1 beyond a stop signal (not illustrated), which is mechanically connected to the ground plate 23, the switching device 14 will open. The switching device 14 cannot be closed until it is manually operated by the engineer. The switch 14 is so positioned that it will be necessary for the engineer to alight to the ground to effect this closure.

From the foregoing description, it is apparent that I have provided a relatively simple means of limiting the speed of the vehicle to a predetermined value in accordance with the track conditions in a particular block, and also in accordance with the speed at which the vehicle is traveling.

While I have illustrated and described my invention in its preferred form, it is apparent that considerable modification may be made with the arrangement of the ground contact device without departing from the spirit of my invention. For example, my principle of operation is applicable to any other form of track signalling device, such as the inductive or ramp systems. I desire, therefore, to be limited only by the scope of the appended claims.

I claim as my invention:

1. The combination with a railway vehicle mounted upon a track, of means for braking said vehicle, a generator mounted upon said vehicle and driven thereby, means comprising a switch for governing said braking means, said switch being governed by said generator, and means for governing said switch in accordance with track conditions.

2. The combination with a railway vehicle mounted upon a track, of means for braking said vehicle, electrical means mounted upon said vehicle and governed by the speed thereof for governing said braking means, means for governing said electrical means in accordance with track conditions, said electrical means becoming inoperative upon said vehicle's speed falling below a predetermined value.

3. The combination with a railway vehicle mounted upon a track, of means for braking said vehicle, a generator mounted upon said vehicle and driven thereby, means comprising a switch having an operative and inoperative positions for governing said braking means, said switch being governed by said generator, and means for governing said switch in accordance with track conditions, said switch assuming its inoperative position upon the speed of said vehicle falling below a predetermined value.

4. In a brake-actuating system for vehicles provided with air brakes, in combination, a generator adapted to be driven by the vehicle, a plurality of brake-controlling units disposed to be actuated by the generator to limit the speed of the vehicle, means for selectively operating said brake-controlling units, and means operable independently of the generator for applying the brakes to stop the vehicle, and means for locking said independently operable means in its active position.

5. In a brake-actuating system for vehicles provided with air brakes, in combination, a generator adapted to be driven by the vehicle, a plurality of brake-controlling units disposed to be actuated by the generator to limit the speed of the vehicle, means for selectively operating said brake-controlling units, and means operable independently of the generator for applying the brakes to stop the vehicle, said independent brake-applying means being adapted to give a delayed action, and means for locking said independent brake-applying means in its active position.

6. In a brake-actuating system for vehicles provided with air brakes, in combination, a generator adapted to be driven by the vehicle, a plurality of brake-controlling units adapted to be actuated by the generator to limit the speed of the vehicle, means for selectively operating said brake-controlling units, and means operable independently of the generator for applying the brakes to stop the vehicle, means adapted to be actuated by the generator when in operation and retaining the independent brake-applying means inactive.

7. In a brake-actuating system for vehicles provided with air brakes, in combination, a generator adapted to be driven by the vehicle, a plurality of brake-controlling units adapted to be actuated by the generator to limit the speed of the vehicle, means for selectively operating said brake-controlling units, and means operable independently of the generator for applying the brakes to stop the vehicle, means adapted to be actuated by the generator, when in operation, for retaining the independent brake-applying means inactive, said means for retaining the brakes inactive being adapted to effect the application of the brakes when the generator ceases to function.

8. In a brake-actuating system for vehicles provided with air brakes, in combination, a generator adapted to be driven by the vehicle, a plurality of brake-controlling units adapted to be actuated by the generator to limit the speed of the vehicle, means for selectively operating said brake-controlling units, means operable independently of the generator for applying the brakes to stop the vehicle, means adapted to be actuated by the generator, when in operation, for retaining the independent brake-applying means inactive, said means for retaining the brakes inactive being adapted to effect the application of the brakes when the generator ceases to function, and means for locking said independent brake-applying means in its active position.

In testimony whereof, I have hereunto subscribed my name this 9th day of July 1924.

ANDREW H. CANDEE.